(12) United States Patent
Moser et al.

(10) Patent No.: US 11,091,181 B2
(45) Date of Patent: Aug. 17, 2021

(54) DEVICE FOR SECURING BRAKING DEVICES TO A CHASSIS FRAME OF A RAIL VEHICLE

(71) Applicant: SIEMENS AG OESTERREICH, Vienna (AT)

(72) Inventors: Christian Moser, Graz (AT); Radovan Seifried, Maribor (SI)

(73) Assignee: SIEMENS MOBILITY AUSTRIA GMBH, Vienna (AT)

( * ) Notice: Subject to any disclaimer, the term of this patent is extended or adjusted under 35 U.S.C. 154(b) by 411 days.

(21) Appl. No.: 15/570,149

(22) PCT Filed: Mar. 29, 2016

(86) PCT No.: PCT/EP2016/056750
§ 371 (c)(1),
(2) Date: Mar. 27, 2018

(87) PCT Pub. No.: WO2016/173791
PCT Pub. Date: Nov. 3, 2016

(65) Prior Publication Data
US 2018/0194375 A1 Jul. 12, 2018

(30) Foreign Application Priority Data
Apr. 30, 2015 (AT) .............................. A 50350/2015

(51) Int. Cl.
*B61H 13/36* (2006.01)
*B61F 5/52* (2006.01)
*F16D 65/02* (2006.01)

(52) U.S. Cl.
CPC .............. *B61H 13/36* (2013.01); *B61F 5/52* (2013.01); *F16D 65/02* (2013.01)

(58) Field of Classification Search
CPC . B29C 70/04; B29C 70/06; B61F 1/08; B61F 5/50; B61F 5/523; B61G 7/00;
(Continued)

(56) References Cited

U.S. PATENT DOCUMENTS 1,388,682 A * 8/1921 Wisniewski ............. B61H 1/00
188/53
1,494,838 A * 5/1924 Hedgcock .............. B61H 13/36
188/210
(Continued)

FOREIGN PATENT DOCUMENTS

CN 103523037 1/2014
CN 103786739 5/2014
(Continued)

*Primary Examiner* — Bradley T King
*Assistant Examiner* — Mahbubur Rashid
(74) *Attorney, Agent, or Firm* — Cozen O'Connor (57) ABSTRACT

A device for securing braking devices to a chassis frame of a rail vehicle forming a cross-member of the chassis frame that has a longitudinal axis, and includes at least two securing points for braking devices, wherein the securing points are spaced apart from the cross-member in a longitudinal direction which lies normal to the longitudinal axis, where at least one respective securing point is arranged at the end on a continuous brake carrier having an open cross section, where a connector is provided, via which the brake carrier is both connected to the cross-member and is spaced apart from the cross-member in a vertical direction to reduce the weight and so as not to simultaneously increase the warp stiffness of the chassis frame.

19 Claims, 3 Drawing Sheets

(58) Field of Classification Search
CPC .......... B61C 17/00; B61H 13/36; B61H 1/00; B61H 13/34; B61H 13/26; B60T 17/228; F16D 2055/0008; F16D 2051/003
See application file for complete search history.

(56) References Cited

U.S. PATENT DOCUMENTS

| | | | | |
|---|---|---|---|---|
| 1,513,519 | A * | 10/1924 | Priebe | B61H 1/00 188/209 |
| 1,707,536 | A * | 4/1929 | Nuetzel | B61H 1/00 188/209 |
| 1,720,188 | A * | 7/1929 | Nowak | B61H 1/00 188/57 |
| 1,838,388 | A * | 12/1931 | Geddes | B61H 13/36 188/210 |
| 1,936,392 | A * | 11/1933 | Hedgcock | B61H 1/00 188/210 |
| 1,936,897 | A * | 11/1933 | Baselt | B61H 13/24 188/56 |
| 2,076,325 | A * | 4/1937 | Smith | B61H 13/36 188/210 |
| 2,177,954 | A * | 10/1939 | Stewart | B61H 1/00 188/58 |
| 2,192,171 | A * | 3/1940 | Akitt | B61F 5/122 105/197.2 |
| 2,238,954 | A * | 4/1941 | Stewart | B61H 1/00 188/58 |
| 2,283,846 | A * | 5/1942 | Busse | B61H 13/36 188/210 |
| 2,312,065 | A * | 2/1943 | Barrows | B61H 13/36 188/212 |
| 2,378,537 | A * | 6/1945 | Dath | B61H 1/00 188/33 |
| 2,393,121 | A * | 1/1946 | Rich | B61H 13/34 188/210 |
| 2,459,323 | A * | 1/1949 | Kass | B61H 13/36 188/210 |
| 2,469,323 | A * | 5/1949 | Barrows | B61F 5/32 188/190 |
| 2,706,537 | A * | 4/1955 | Packard | B61H 13/36 188/210 |
| 2,903,096 | A * | 9/1959 | Busch | B61H 1/00 188/59 |
| 2,917,134 | A * | 12/1959 | Buvelot | B61H 13/24 188/56 |
| 3,009,544 | A * | 11/1961 | Maloney | B61H 1/00 188/52 |
| 3,023,855 | A * | 3/1962 | Shafer | B60T 8/1893 188/195 |
| 3,027,976 | A * | 4/1962 | Soddy | B61H 5/00 188/59 |
| 3,056,474 | A * | 10/1962 | Spaeth | B61H 13/34 188/210 |
| 3,307,659 | A * | 3/1967 | Goods | B60T 17/081 188/59 |
| 3,762,506 | A * | 10/1973 | Bannister | B61H 5/00 188/59 |
| 4,109,934 | A * | 8/1978 | Paton | B60G 5/04 105/198.7 |
| 4,196,671 | A * | 4/1980 | Herring, Jr. | B61F 5/144 105/199.3 |
| 5,462,139 | A | 10/1995 | Jones, Jr. et al. | |
| 5,785,159 | A * | 7/1998 | Jackson | B61H 13/36 105/182.1 |
| 5,875,721 | A * | 3/1999 | Wright | B61F 5/122 105/197.2 |
| 6,247,413 | B1 * | 6/2001 | Teichmann | B61F 5/22 105/199.1 |
| 6,279,696 | B1 * | 8/2001 | Daugherty, Jr. | B61H 1/00 188/209 |
| 6,551,003 | B1 * | 4/2003 | De La Fuente-Farias | B60T 11/06 188/219.1 |
| 7,070,177 | B2 * | 7/2006 | Pavuk | B60G 5/00 188/219.1 |
| 7,527,131 | B1 * | 5/2009 | Wike | B61H 13/36 105/182.1 |
| 7,823,513 | B2 * | 11/2010 | Forbes | B61F 5/06 105/193 |
| 8,770,604 | B2 * | 7/2014 | Brereton | B60G 11/28 280/124.128 |
| 9,856,933 | B2 * | 1/2018 | Koziol | F16D 65/0037 |
| 2012/0111675 | A1 * | 5/2012 | Diemling | B61F 5/32 188/233.7 |
| 2016/0362120 | A1 * | 12/2016 | Ma | B61F 5/24 |

FOREIGN PATENT DOCUMENTS

| | | | | |
|---|---|---|---|---|
| DE | 3930873 | | 1/1991 | |
| EP | 0568044 | | 11/1993 | |
| GB | 860248 | A * | 2/1961 | .............. B61H 1/00 |
| KR | 20120063006 | | 6/2012 | |
| WO | WO-8604555 | A1 * | 8/1986 | ................ B61F 5/52 |
| WO | WO2011006795 | | 1/2011 | |

\* cited by examiner

DEVICE FOR SECURING BRAKING DEVICES TO A CHASSIS FRAME OF A RAIL VEHICLE

CROSS-REFERENCE TO RELATED APPLICATIONS

This is a U.S. national stage of application No. PCT/EP2016/056750 filed 29 Mar. 2016 and claims the priority of Austrian application No. A50350/2015 filed Apr. 30, 2015, the content of which is incorporated herein by reference in its entirety.

BACKGROUND OF THE INVENTION

1. Field of the Invention

The invention relates to a device for securing braking devices to a chassis frame of a rail vehicle, comprising a cross-member of the chassis frame, where the cross-member includes a longitudinal axis, and at least two securing points for braking devices, where the securing points are spaced apart from the cross-member in a lengthwise direction that lies normal to the longitudinal axis, and to a chassis frame having the device for securing braking devices.

2. Description of the Related Art

Chassis, also known as bogies, of rail vehicles usually have two wheelsets, which are guided on rails, and are connected to car bodies of the rail vehicle. An essential part of a chassis is a chassis frame, to which are connected the wheelsets via a wheelset guide or a primary suspension system, for example, and the car body via a secondary suspension system and a device for transferring forces, for example. In this case, flows of force between the individual components occurs primarily via the chassis frame.

Usually, the chassis frame comprises two lengthwise members and one or more cross-members, where the embodiment having a cross-member is referred to as H-type. Here, the lengthwise members can also be designed as a frame that is closed by end members.

The ross-member for the H-type is usually developed as a box-type profile and comprises an upper flange, a lower flange and two side walls, each consisting of individual sheets or plate-like metal parts. Here, the lengthwise members are arranged parallel to a lengthwise direction that corresponds to the travel direction of the rail vehicle, where a longitudinal axis of the cross-member lies normal to the lengthwise direction.

In order to allow the rail vehicle to be braked, each of the wheelsets usually has at least one brake disk that interacts with a corresponding braking device, preferably a friction brake such as a compact brake caliper. When the braking device engages with the brake disk, the kinetic energy is converted into frictional energy and the rail vehicle is thereby slowed or brought to a halt. Such braking devices can be designed either as service brakes or as parking brakes. In accordance with the prior art, securing points are therefore provided on the chassis frame for securing the braking devices. Brackets are often provided for this purpose, connected to the cross-member by means of welding, for example, and via which the braking forces are transferred into the cross-member. The considerable forces to be transferred usually result in a complicated geometry for the brackets, and this results inter alia in a complex weld seam contour and a significant increase in weight.

A further structural possibility for providing the securing points for the braking devices takes the form of supplementary members that extend parallel to the cross-member, i.e., parallel to the longitudinal axis, between the lengthwise members and are secured to the lengthwise members. The disadvantage of this embodiment is both the expensive attachment of the supplementary members to the lengthwise members, and the fact that such an additional connection between the lengthwise members leads to an increase in the torsional stiffness of the chassis frame. Torsional stiffness and derailment safety are diametrically opposed. Consequently, any increase in the torsional stiffness is undesirable.

SUMMARY OF THE INVENTION

In view of the foregoing, it is therefore an object of the invention to overcome the disadvantages of the prior art and to provide a device for securing braking devices to a chassis frame of a rail vehicle, where the device has a low weight and a reduced manufacturing cost while at the same time reduces the torsional stiffness of the chassis frame in comparison with the prior art.

These and other objects and advantages are achieved in accordance with the invention by a device for securing braking devices to a chassis frame of a rail vehicle, comprising a cross-member of the chassis frame, where the cross-member includes a longitudinal axis, and at least two securing points for braking devices, where the securing points are spaced apart from the cross-member in a lengthwise direction that lies normal to the longitudinal axis. Here, in accordance with the invention, at least one securing point is arranged at each end of a continuous brake carrier, where the brake carrier has an open cross section, and where attachment means are provided via which the brake carrier is connected to the cross-member and at the same time spaced apart from the cross-member in a vertical direction. By virtue of the brake carrier, on which the two securing points are arranged at each end, it is now possible to secure the braking devices to the cross-member in a simple manner. By virtue of the brake carrier being a continuous member, which therefore extends parallel to the lengthwise direction from a first securing point on one side of the cross-member to the second securing point on the other side of the cross-member without interruption, the number of connecting weld seams required is significantly reduced. These are concentrated exclusively upon securing the attachment means to the cross-member and the brake carrier respectively, because the attachment means represent the sole contact between the brake carrier and the cross-member. By virtue of a structurally favorable format of the attachment means, the effect of the device on the torsional stiffness of the chassis frame is therefore minimized, because the continuous brake carrier is thus spaced apart from the cross-member (from an upper flange of the cross-member in the case of a box-type cross section) in a vertical direction. The vertical direction in this case represents that direction which is formed by the normal vector from lengthwise direction and longitudinal axis. In this case, possible examples for the attachment means include welded, riveted or screwed brackets or pivoted connections, e.g., via bolt eye connections or ball and socket bearings.

By virtue of the open cross section of the brake carrier normal to the lengthwise direction, the weight of the device can be further reduced. Open cross sections include, e.g., I, U, H, Y or L profiles, which can also have recesses to further reduce weight. Here, the brake carrier itself can be manufactured continuously from one part or welded together sectionally, the welding resulting in strengthened cross-sectional points for accommodating the associated weld seams.

By virtue of the open cross section of the brake carrier, at least all of the weld seams required to produce the brake carrier can be post-treated, i.e., ground flat or counter-welded, for example, whereby the strength is increased and the welded seam length can be reduced in its dimensions. The cross-member usually has a box-type cross section relative to the longitudinal axis and, in this case, comprises an upper flange, a lower flange and two side walls connecting the upper flange and the lower flange.

In order to reduce the torsional stiffness of the cross-member and hence the torsional stiffness of the overall chassis frame, in a particularly preferred embodiment of the invention the cross-member has an upper flange, a lower flange and two side walls, where these elements form a box profile, and the cross-member is formed as a bent part, where a bent region is formed in each case between the side walls and the upper flange and between the side walls and the lower flange. Bent parts are produced in a bending operation or press brake operation by introducing a bending moment into a plane raw body, i.e., working or sheet working, where the raw body is plastically shaped and thereby made into a two-dimensional or three-dimensional form. Suitable production methods include, e.g., die bending or swivel bending. Any regions that have been plastically shaped are referred to as bent regions and are characterized by a homogenous and favorable stress distribution.

The cross-member that is developed as a bent part, with the bent part possibly being composed of a plurality of bent components, therefore has a particularly favorable stress distribution, because instead of the edge between the upper flange and the side wall, the bent region connects the upper flange and the side walls. The same applies correspondingly to the connection of the lower flange and the side walls. The bent regions refer to the respective plastically shaped, preferably curved, regions of the cross-member. By virtue of the favorable stress distribution, it is possible to reduce the thickness of the sheet from which the cross-member is produced and at the same time eliminate the need for fillet welds to connect the elements, whereby both weight and torsional stiffness are reduced.

In accordance with a further particularly preferred embodiment of the invention, the cross-member has a flange opening at least in the upper flange and in the lower flange, where at least one of the flange openings occupies at least 50% of the surface of the upper and/or lower flange. By virtue of the relatively large flange opening, the torsional stiffness of the cross-member is reduced still further, in order to achieve significantly improved derailment safety of the rail vehicle. If the other flange opening also occupies at least 35% of the surface of the respective element, a further amplification of the effect is produced. Further flange openings can also be provided on the side walls to reduce the weight and the torsional stiffness, here.

In the case of cross-members with low torsional resistance, the introduction of the braking forces in the form of transverse forces causes torsion of the cross-member, placing an additional load on the heavily loaded weld seams at the attachment points between lengthwise members and cross-members in particular, and therefore in a further embodiment of the device in accordance with the invention each attachment means is connected to a side wall of the cross-member. In particular, if the cross-member has flange openings and therefore an open cross section, then the shear center is displaced as per the mechanics of materials from the inside of the cross-member to the outside of the cross-member. Consequently, the connection of the attachment means in the region of the side walls therefore results in a transfer of the braking forces into the cross-member in the region of the shear center. Such a transfer of force, which preferably occurs in the shear center itself, results in a torsion-free bending load of the cross-member, again as per a known principle of the mechanics of materials. It is apparent in this case that the format of the cross-member as a bent part is advantageous for this embodiment of the invention, but only the presence of a box-type cross section comprising upper flange, lower flange and in particular side walls is a necessary condition. Accordingly, embodiments with a box-type cross-member are also conceivable in which the cross-member is not developed as a bent part. This applies equally to all of the following embodiments.

In an alternative embodiment of the invention, the attachment means comprise a joint that is connected to the cross-member and a spacer element that is connected to the brake carrier to produce a pivoted connection between brake carrier and cross-member. In particular, if the brake carrier is connected to the cross-member via at least a pair of joints and spacer elements, one attachment means being arranged in front of and one behind the cross-member viewed in a lengthwise direction, i.e., if at least one attachment means is arranged on each side wall, then the braking forces are transferred into the cross-member as a force couple. Accordingly, the end of the spacer element has an eye, through which a bolt is passed and pivotably connects joint and spacer element together.

In order to exploit the effect of pure bending when force is transferred in the shear center, in a further alternative embodiment of an inventive device for securing braking devices the joint is arranged in the shear center of the cross-member. The braking forces are transferred at a defined point (i.e., the joint) by virtue of the pivoted connection of the brake carrier to the cross-member. As a result, the transfer of force in the shear center of the cross-member can be achieved in a simple manner by arranging the joint itself in the shear center of the cross-member using structural means, such as brackets or similar. Here, the term shear center refers to the shear center of that cross section of the cross-member, with the cross section being viewed normal to the longitudinal axis, at which the attachment means, i.e., joint and spacer element, are arranged.

In accordance with a preferred embodiment of the invention, the attachment means comprises at least one bracket that is oriented normal to the longitudinal axis and include a first connection section that is connected to the cross-member and a second connection section that is connected to the brake carrier, where the connection sections are welded to the cross-member and brake carrier, respectively. Brackets represent a particularly weight-saving structural measure for attaching the brake carrier, because the brackets are usually plate-type parts or sheets, preferably of metal or steel, which have a low weight relative to flexural strength. The brackets each lie on a plane whose normal vector is aligned parallel to the longitudinal axis of the cross-member. Here, at least one bracket, preferably two, is usually welded onto each side wall of the cross-member. By virtue of the plane structural format of the brackets, whose thickness is therefore small relative to their dimensions of length and width, the application or post-treatment of the weld seams at the connection sections, e.g., grinding flat or counter-welding, can be achieved at relatively low cost in comparison with solutions in accordance with the prior art. As a result of post-processing the weld seams, the strength of the weld seams is increased, particularly the fatigue strength, and the use of high-strength sheets allows both the overall thickness of the sheets and the length of the weld seams to be reduced, in order thereby to achieve a further reduction in the weight of the device and hence the chassis frame.

In order to lengthen the weld seam in the first connection section, in a further preferred embodiment of the device the first connection section is C-shaped and fit closely against the cross-member, such that the first connection section encompasses the side wall of the cross-member completely. By virtue of the C-shape of the connection section, which is formed by a recess in the bracket, the first connection section at the long edge of the C-shape fits preferably flush against the side wall of the cross-member. In this case, the short edges of the C-shape abut, at least sectionally, the upper flange and the lower flange of the cross-member, where the bent regions that may be present between the side wall and the upper flange or between the side wall and the lower flange are also enclosed and abutted by the connection section as applicable. The first connection section therefore encompasses the cross-member in the manner of a clamp and allows the application of long uninterrupted weld seams in addition to a favorable transfer of the braking forces into the cross-member. The bracket is obviously arranged on the outside of the side wall of the cross-member, i.e., that side whose normal vector points away from the longitudinal axis.

In a further preferred embodiment of a device according to the invention, the second connection section encloses an acute angle with a plane that extends over a lengthwise direction and a longitudinal axis, where the imaginary intersection point between the extension of the second connection section and the plane is arranged on that side of the side wall that faces away from the longitudinal axis. In order to allow the weld seams to be produced with ease, the second connection section usually has a straight profile, though a curved profile is also possible, where in the case of a curved profile the extension of the second connection section relates to the imaginary straight line between start point and end point of the second connection section. As a result of the diagonal of the second connection section, with the diagonal being defined by the acute angle, a favorable transfer of force is achieved from the brake carrier into the bracket, in particular the action lines of the forces are at least partly directed through the shear center of the cross-member, and the length of the weld seam in the second connection section is increased. It is, however, equally feasible for the second connection section, provided sufficient structural space is available and the length of the weld seam applied in the second connection section does not have to be increased by a diagonal configuration, to extend horizontally in an alternative embodiment variant, i.e., normal to the vertical direction and parallel to the longitudinal axis and lengthwise direction. Here, the second connection section is arranged (at least sectionally in the case of a diagonal arrangement) in a vertical direction above the plane that is formed by the lengthwise direction and the longitudinal axis. Here, the second connection section is preferably arranged in the region of the upper flange of the cross-member, i.e., spaced apart from the longitudinal axis in a vertical direction, preferably by at least half of the distance between upper flange and lower flange measured in the vertical direction.

In a particularly preferred embodiment of an inventive device for securing braking devices, the brake carrier comprises two side elements and a web that interconnects them, where the brake carrier has an essentially H-shaped cross section as viewed in a lengthwise direction. The two side elements, formed as sheets that are preferably made of metal or steel, allow a structurally simple format of the securing points, in addition to which, e.g., that section connected to the second connection section of the brackets can be welded to the brackets via a butt seam. Here, an H-shaped cross section is understood to mean that the side walls starting from the web extend parallel to the vertical direction on both sides of the web. The profile of the web can be entirely linear, for example, or it can be sectionally oblique or curved, here. By virtue of the H-shaped cross section of the brake carrier, it is therefore possible both to reduce the weight and to produce and post-process the weld seams connecting the side elements and the web.

In order to achieve an even transfer of the braking forces into the cross-member exclusively via the attachment means and thus to bridge the structural space between cross-member and wheel axles on which brake disks are arranged for interaction with the braking devices, in a further particularly preferred embodiment of the invention the brake carrier comprises two projecting sections and a central section which connects the two projecting sections, where the projecting sections each extend outwards from a side wall of the cross-member and parallel to the lengthwise direction, and the central section bridges the cross-member in a lengthwise direction.

In order to allow the distance to be created between brake carrier and cross-member, e.g., between that point of the central section that is closest to the upper flange and the upper flange itself, the attachment means are configured such that a minimum distance in a vertical direction, e.g., 50 mm, 100 mm or 200 mm, is maintained between the brake carrier and the cross-member. Therefore, in the case of brackets, the attachment means also structurally comprise, in addition to the actual brackets, bracket-type sections of the side elements of the cross-member, where the bracket-type sections extend from the side elements in the direction of the brackets, such that it is possible to ensure the minimum distance is maintained via the dimensioning of brackets and bracket-type sections. Any distribution between bracket-type sections and actual brackets is feasible in this case, though it is more favorable for manufacturing reasons for the brackets to represent the larger part, between 65% and 90%. Such a distribution between bracket-type sections and spacer elements is equally feasible. Therefore, in a further particularly preferred embodiment of the invention the attachment means comprise bracket-type sections of the side elements for connection to the second connection sections, where the bracket-type sections are each arranged in the projecting sections of the brake carrier on that side of the side elements that faces towards the cross-member.

It is also an object of the invention also to provide a chassis frame with a device in accordance with the disclosed embodiments of the invention for securing braking devices, comprising two lengthwise members and a cross-member which connects the two lengthwise members, where two brake carriers with open cross sections are connected to the cross-member via attachment means, and where each brake carrier has a securing point for braking devices at each end in a lengthwise direction. Since a wheel axle of the rail vehicle is usually equipped with at least two brake disks which interact with a braking device in each case, provision is made for two brake carriers such that in total at least four securing points are available for braking devices, one per projecting section and therefore two per wheel axle. The brake carriers are not connected to the lengthwise members, but are only connected to the cross-member via the attachment means. As a result, the torsional stiffness of the chassis frame is not negatively affected by the device in accordance with disclose embodiments of the invention.

In a further embodiment of the chassis frame in accordance with the invention, the attachment means of a brake carrier to has four bracket-type sections and four brackets, where the first connection section of a bracket is connected to a side wall of the cross-member and the second connection section is connected to a bracket-type section of a side element of the brake carrier in each case. Here, two brackets are each welded onto a side wall of the cross-member in, being spaced apart from each other in a direction parallel to the longitudinal axis, such that each side element of the brake carrier viewed in a lengthwise direction is welded on both in front of and behind the cross-member at a bracket-type section via a bracket. The brake carriers are spaced apart from each other in a direction parallel to the longitudinal axis of the cross-member, where the distance between the brake carriers is approximately twice the distance between a brake carrier and the closest lengthwise member. A uniform transfer of the braking forces into the cross-member is achieved thereby, with the overall weight of the chassis frame being significantly reduced in comparison with the prior art.

In order to create at least one (preferably two) further securing point for braking devices, e.g., if three brake disks per wheel axle are provided, in a further preferred embodiment of the invention at least one (preferably two) supplementary member is aligned parallel to the longitudinal axis of the cross-member and connects two projecting sections of the two brake carriers, where the supplementary member has a further securing point for a braking device. In this case, provision is usually made for one supplementary member on each side of the cross-member, such that the two first projecting sections and the two second projecting sections of both brake carriers are connected together via a supplementary member in each case. In order to reduce the leverage, the supplementary member is usually arranged closer in a lengthwise direction to the securing points than to the cross-member itself, here. The supplementary member can be a tube, for example, which is passed through locating holes in the side elements of the brake carriers and is welded into the locating holes.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In order to illustrate the invention further, the following part of the description refers to the figures, from which further advantageous embodiments, details and developments of the invention may be derived. The figures are merely exemplary and while they are intended to demonstrate the character of the invention, they do not in any way restrict or conclusively depict this, in which.

DETAILED DESCRIPTION OF THE EXEMPLARY EMBODIMENTS

Figure 1:
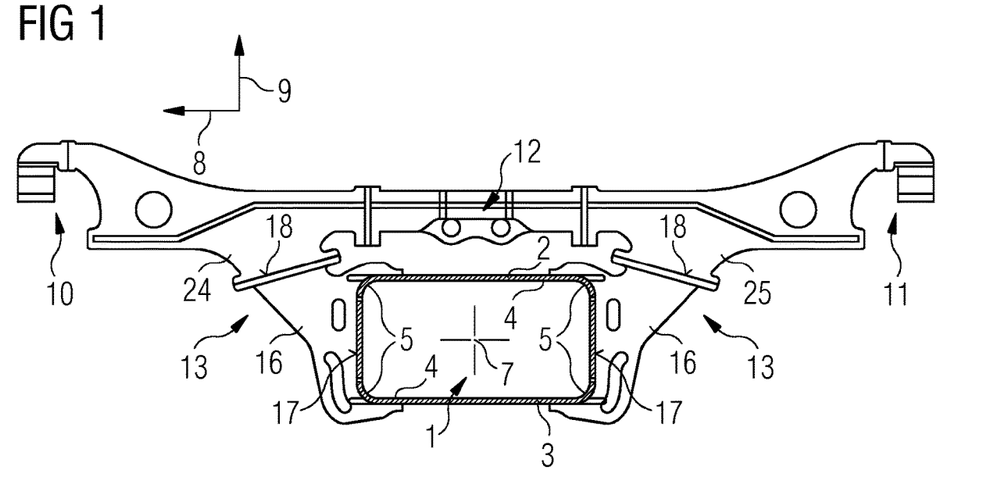
FIG. 1 shows a side view of an embodiment of a device in accordance with the invention.

FIG. 1 shows an embodiment of a device for securing braking devices to a chassis frame of a rail vehicle. Here, the device comprises a cross-member 1 with a longitudinal axis 7, which cross-member 1 connects the two lengthwise members (not shown) of the chassis frame. The cross-member 1 has a box-type cross section, which lies in a plane normal to the longitudinal axis 7 and is formed by an upper flange 2, a lower flange 3 and two side walls 4 connecting these. In the present exemplary embodiment, the cross-member 1 is formed as a bent part in this way, i.e., the cross-member 1 was bent from a flat sheet via a suitable bending process such that bent regions 5 were formed at the transition zones between the upper flange 2 and the side walls 4 and between the lower flange 3 and the side walls 4 as a result of the plastic shaping of the plane raw body. These bent regions 5 have a quarter-circle radius in cross section.

For the purpose of holding the braking devices, the device has a first securing point 10 and a second securing point 11 which, viewed in a lengthwise direction 8 that lies normal to the longitudinal axis 7 and corresponds essentially to the travel direction of the rail vehicle, are spaced apart from the cross-member 1 such that relative to the longitudinal axis 7 the first securing point 10 is arranged on one side and the second securing point 11 on the other side of the cross-member 1. Here, the two securing points 10, 11 are mounted on a brake carrier 12 that is arranged above the cross-member 1 relative to the longitudinal axis 7 and extends parallel to the lengthwise members in a lengthwise direction 8. The brake carrier 12 is configured so as to be continuous in this case, such that the flow of force in the brake carrier 12 is not interrupted between the two securing points 10, 11 over the entire length of the brake carrier 12 in a lengthwise direction 8.

In order to attach the brake carrier 12 to the cross-member 1, provision is made for attachment means 13 which allow the transfer of the braking forces from the brake carrier 12 into the cross-member 1 while ensuring a distance in a vertical direction 9 between brake carrier 12 and cross-member 1. Here, the vertical direction 9 lies normal to a plane that extends over the lengthwise direction 8 and longitudinal axis 7, thereby forming an orthogonal system of coordinates. The attachment means 13 are each connected to a side wall 4, and therefore the brake carrier 12 is connected to the cross-member 1 via at least two attachment means 13, these being arranged on both sides of the cross-member 1 in the lengthwise direction 8 in a manner that is symmetrical relative to a plane of symmetry formed by vertical direction 9 and longitudinal axis 7.

In the present exemplary embodiment, the attachment means 13 are configured as brackets 16 and bracket-type sections 24, 25 of the brake carrier 12, connecting the brake carrier 12 to the cross-member 1 as a welded structure.

The bracket 16 consists of a sheet of metal, such as steel, which is flat and whose thickness is small relative to the other dimensions. For the purpose of connecting to the cross-member 1, the bracket has a first connection section 17 that encompasses a side wall 4 of the cross-member 1 in the manner of a clamp. To this end, the first connection section 17 is configured so as to be C-shaped, such that the long edge of the C-shape closely abuts the side wall 4 of the cross-member 1. Here, the short ends of the C-shape abut the respective bent region 5 and a section of respectively the upper flange 2 or the lower flange 3 that is adjacent to the bent region 5. By virtue of the specific format of the first connection section 17, it is possible to apply a long continuous weld seam to connect cross-member 1 and bracket 16.

In order to connect the bracket 16 to the brake carrier 12, the bracket 16 has a second connection section 18 that is welded to the bracket-type sections 24, 25. In addition to a first element, which forms the C-shaped first connection section 17, the bracket 16 in this way comprises a further element, which extends obliquely from the first element towards the bracket-type sections 24, 25, resulting in an essentially trapezoid shape of the further element, which flows continuously into the respective bracket-type section 24, 25. In this way, the further element of the bracket 16 forms the second connection section 18, which has a straight profile viewed in the direction of the longitudinal axis 7. The imaginary extensions of the second connection sections 18 of the two brackets 16 intersect each other in the plane of symmetry and form a roof shape, i.e., the extensions of the second connection sections 18 intersect a plane that extends over longitudinal axis 7 and lengthwise direction 8 outside of the cross-member 1, i.e., on that side that faces away from the longitudinal axis 7 relative to the respective side wall 4.

Figure 2:
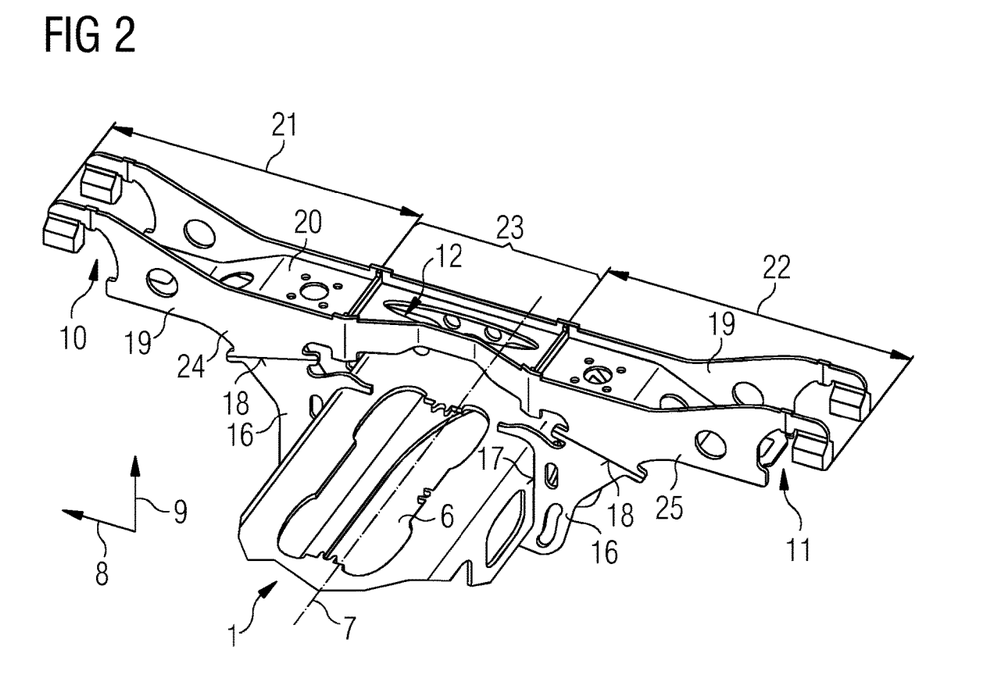
FIG. 2 shows an axonometric view of the device of FIG. 1 seen obliquely from above.

It can clearly be seen in FIG. 2 that the brake carrier 12 has an open cross section, specifically an H-shaped cross section, viewed normal to the lengthwise direction 8. Accordingly, the brake carrier 12 comprises a web 20 that extends essentially parallel to upper flange 2 and lower flange 3 and, projecting beyond the web 20 on both sides, two side elements 19 that are aligned parallel to the vertical direction 9 and preferably form a right angle with the web 20. The brake carrier 12 is divided into a central section 23 that is arranged above the upper flange 2, and two projecting sections 21, 22, where the first projecting section 21 extends from the central section 23 parallel to the lengthwise direction 8 over the bracket 16 that is mounted on the one (e.g. the left-hand) side wall 4, and has the first bracket-type section 24 and the first securing point 10 at the end. The second projecting section 22 similarly extends over the bracket 16 that is mounted on the other (e.g. the right-hand) side wall 4, and has the second bracket-type section 25 and the second securing point 11. The web 20 in this case extends closer in a vertical direction 9 to the upper flange 2 in the region of the securing points 10, 11 than it does in the central section 23, where provision is made between the two regions for an intermediate diagonal in which the web 20 does not run parallel to the upper flange 2. The sections 21, 22, 23 of the brake carrier 12 are each connected together via weld seams, where an integral embodiment, i.e., a continuous web 20 with continuous side elements 19, is also conceivable.

The bracket-type sections 24, 25 are formed by the side elements 19 of the brake carrier 12 and connected via weld seams to the second connection section 18 of the brackets 16. Here, brackets 16 and bracket-type sections 24, 25 are dimensioned such that the brake carrier 12 is spaced apart from the upper flange 2 of the cross-member 1 in a vertical direction, and is only connected to the cross-member via the attachment means 13, i.e., brackets 16 and bracket-type sections 24, 25, and therefore does not rest thereupon. While in the present case the brackets 16 bridge most of the distance parallel to the vertical direction 9 between longitudinal axis 7 and brake carrier 12, because the second connection section 18 is already arranged above the upper flange 2 in the vertical direction 9, it is also feasible in alternative embodiment for the distance between the second connection section 18 and longitudinal axis 7 to be considerably smaller in the vertical direction 9 and for the bracket-type sections 24, 25 to bridge the majority of the distance accordingly.

It can also be seen from FIG. 2 that the upper flange 2 of the cross-member 1 has a flange opening 6 that occupies approximately 35% of the surface of the upper flange 2. The lower flange 3 also has a flange opening 6, which occupies approximately 60% of the surface of the lower flange 3 (see also FIG. 3). By virtue of these flange openings 6, the weight of the cross-member 1 is reduced and an open cross section of the cross-member 1 is achieved. The shear center of an open cross section in the present case according to the principles of the mechanics of materials lies outside of cross-member 1 itself, in the region of the brackets 16. Therefore part of the braking forces transferred via the brake carrier 12 are transferred via the bracket 16 into the shear center of the cross section of the cross-member 1, thereby reducing the torsional load of the cross-member 1.

Figure 3:
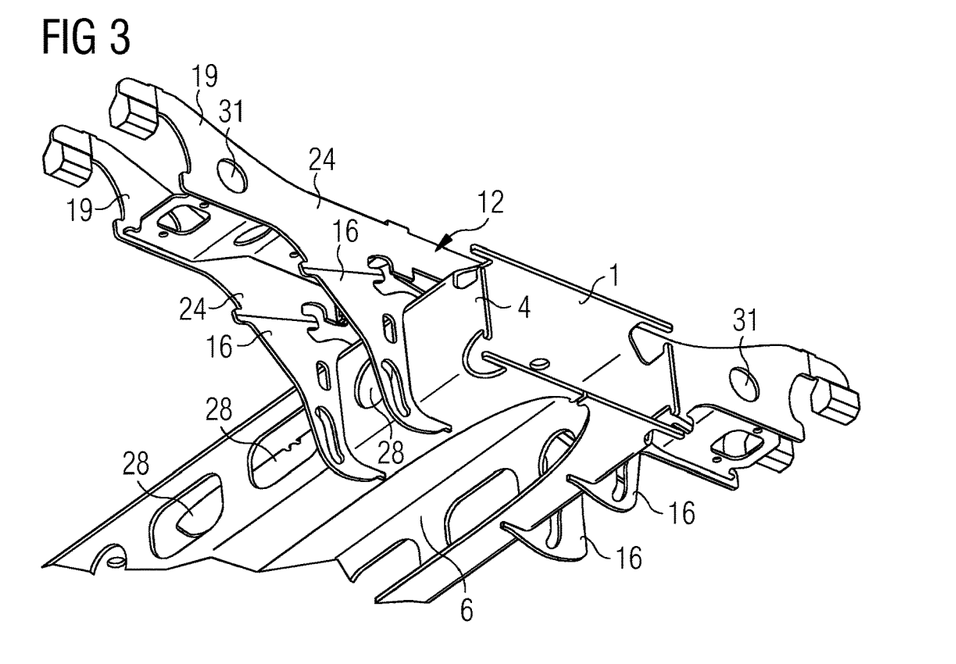
FIG. 3 shows an axonometric view of the device of FIG. 1 seen obliquely from below.

FIG. 3 clearly shows the flange opening 6, which has an elliptical shape, in the lower flange 3. Also marked are locating holes 31, which have a circular shape and are arranged in the side elements 19 of the brake carrier 12, for a supplementary member 26 (see FIG. 5). The side walls 4 of the cross-member 1 have further flange openings 28, where the brackets 16 are each arranged between two further flange openings 28, such that the side wall 4 is abutted by the bracket 16 over the entire first connection section 17 (see FIGS. 1 and 2). Two brackets 16 are therefore each mounted on a side wall 4, and are welded to two first bracket-type sections 24 of the side elements 19 of the brake carrier 12 in the case illustrated. Correspondingly, two brackets 16 are arranged equally on the other side wall 4, where the second bracket-type sections 25 is masked by the cross-member 1 in this illustration.

Figure 4:
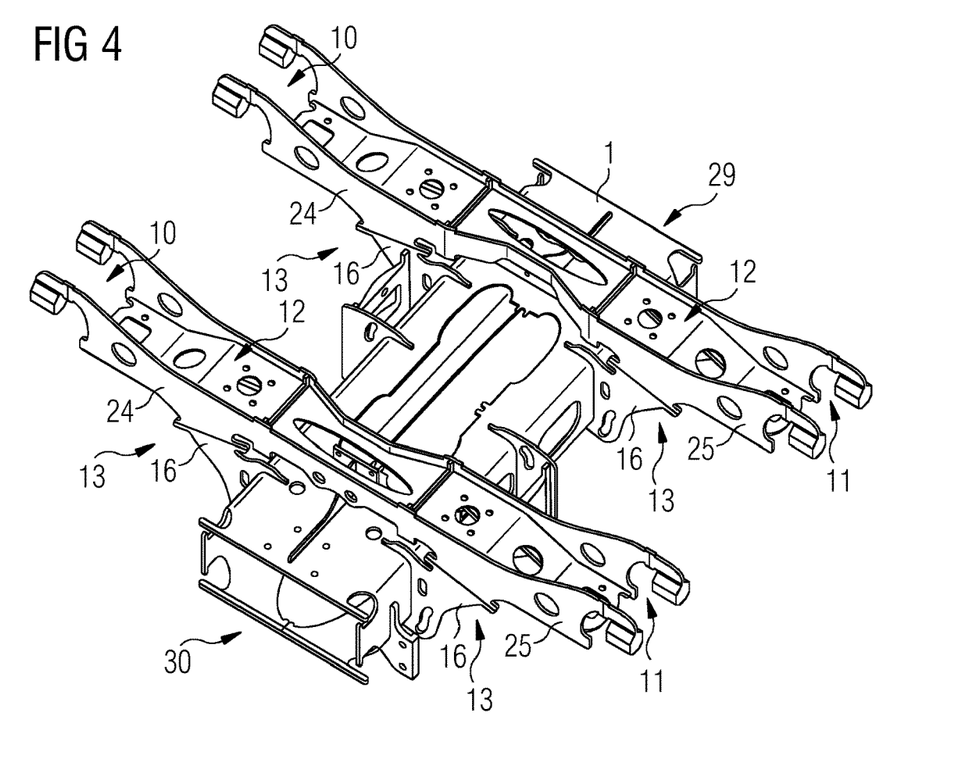
FIG. 4 shows an axonometric view of an embodiment of a chassis frame with two brake carriers in accordance with the invention.

FIG. 4 shows a chassis frame comprising an device for securing braking devices in accordance with the invention, where the cross-member 1 connects two lengthwise members (not shown). For the sake of clarity, the lengthwise members are omitted from the illustration, with only a first and second attachment point 29, 30 for attaching the lengthwise members being marked. In order to provide braking devices for a wheel axle having a plurality of brake disks, in this exemplary embodiment, two brake carriers 12 are attached to the cross-member 1 via the previously described attachment means 13, i.e., via respectively four brackets 16 and four corresponding first and second bracket-type sections 24, 25 of the brake carriers 12 in this case. Each of the brake carriers 12 has a first and a second securing point 10, 11, meaning that a total of four braking devices can be secured to the chassis frame. Here, the brake carriers 12 are spaced apart from each other in a direction parallel to the longitudinal axis 7 of the cross-member 1, where the distance between the mutually facing side elements 19 of the brake carriers 12 is approximately twice the distance between the side elements 19 that face in the opposite direction and the attachment points 29, 30. Here, the brake carriers 12 are arranged symmetrically in relation to a further plane of symmetry that lies normal to the longitudinal axis 7, where the further plane of symmetry passes through the midpoint of the cross-member 1 relative to its extension parallel to the longitudinal axis 7.

Figure 5:
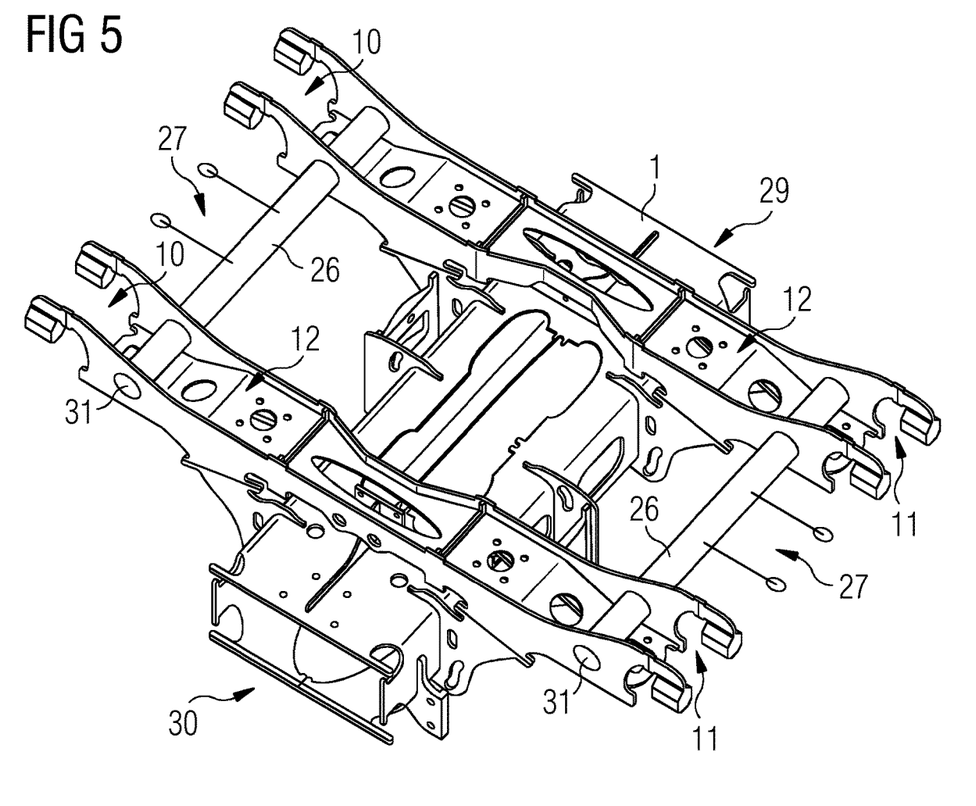
FIG. 5 shows an axonometric view of a further embodiment of a chassis frame with two brake carriers in accordance with the invention.

FIG. 5 shows a further embodiment of a chassis frame in which supplementary members 26 are each passed through the previously cited locating holes 31 (FIG. 3) in the side elements 19 of the brake carrier 12, where the supplementary members 26 interconnect two first projecting sections 21 and two second projecting sections 22 in each case. Here, the supplementary members 26 are aligned parallel to the longitudinal axis 7 of the cross-member 1 and each offer a further securing point 27 that is disposed centrally in a direction parallel to the longitudinal axis 7, in order to be able to hold a braking device for a third brake disk of the wheelset. It would be equally possible to make provision for four or more securing points, for example.

Figure 6:
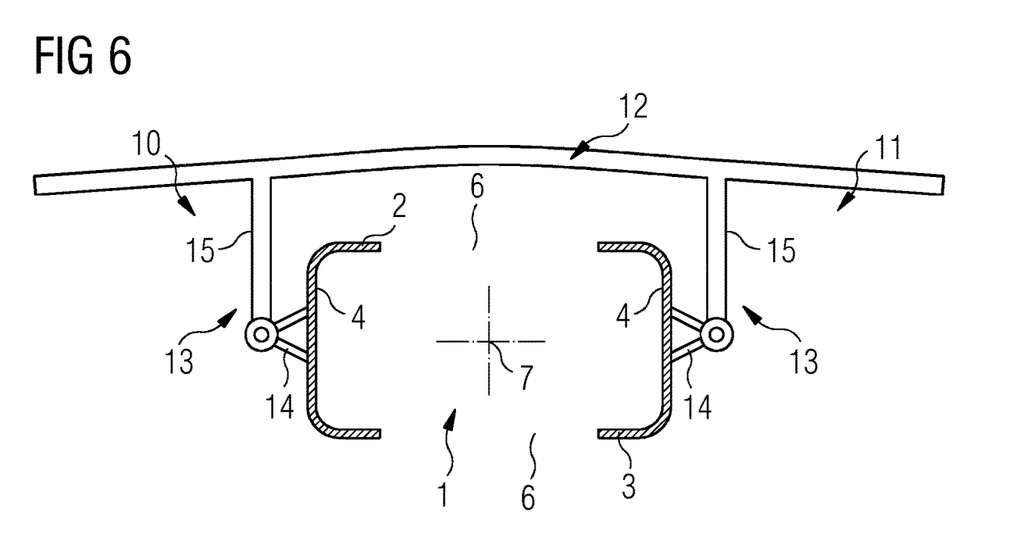
FIG. 6 shows a schematic representation of an alternative embodiment of a device in accordance with the invention.

FIG. 6 shows an alternative embodiment of the invention. Here, the attachment means 13 are designed as a joint 14 that is secured to a side wall 4 of the cross-member 1 in each case and a spacer element 15 that is secured to the brake carrier 12 and takes the form of a member or a further bracket or a further bracket-type section, for example. Here, the cross-member 1 is represented as two C-shaped components, because the flange openings 6 in the upper flange 2 and lower flange 3 result in an open profile of the cross-member 1 in this cross section. The shear center of such an open cross section lies outside the cross-member 1 itself and therefore the joints 14 are arranged in the shear center of the open cross section, such that the braking forces which are transferred via the brake carriers 12 and spacer elements 15 into the joints 14 result in a torsion-free bending of the cross-member 1 in accordance with the known principles of the mechanics of materials.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for securing braking devices to a chassis frame of a rail vehicle comprising a cross-member of the chassis frame, said cross-member having a longitudinal axis, and at least two securing points for braking devices, the securing points being spaced apart from the cross-member in a lengthwise direction which lies normal to the longitudinal axis, the device comprising:
    a continuous brake carrier arranged above the cross-member, extending parallel to lengthwise members of the chassis frame in a lengthwise direction and securing the braking devices to the chassis frame of the rail vehicle, said continuous brake carrier having at least one securing point of the at least two securing points arranged at each end of the continuous brake carrier, and said continuous brake carrier having an open cross section; and
    attachment means via which the continuous brake carrier for securing the braking devices to the chassis frame of the rail vehicle is connected to the cross-member and is spaced apart from the cross-member in a vertical direction;
    wherein a flow of force in the continuous brake carrier is uninterrupted between the at least two securing points over an entire length of the continuous brake carrier in the lengthwise direction.

2. The device as claimed in claim 1, wherein the cross-member has an upper flange, a lower flange and two side walls, said elements upper flange, lower flange and two side walls forming a box profile; and
    wherein the cross-member is formed as a bent part, a bent region is formed in each case between the two side walls and the upper flange and between the two side walls and the lower flange.

3. The device as claimed in claim 2, wherein the cross-member includes a flange opening at least at the upper flange and at the lower flange; and
    wherein the at least one flange opening occupies at least 50% of the surface of at least one of (i) the upper flange and (ii) the lower flange.

4. The device as claimed in claim 2, wherein each attachment means is connected to a side wall of the cross-member.

5. The device as claimed in claim 4, wherein the attachment means comprises a joint which is connected to the cross-member and a spacer element which is connected to the continuous brake carrier for securing the braking devices to the chassis frame of the rail vehicle to create a pivoted connection between the continuous brake carrier for securing the braking devices to the chassis frame of the rail vehicle and the cross-member.

6. The device as claimed in claim 5, wherein the joint is arranged in a shear center of the cross-member.

7. The device as claimed in claim 4, wherein the attachment means comprises at least one bracket which is oriented normal to the longitudinal axis and which includes a first connection section connected to the cross-member and a second connection section connected to the continuous brake carrier for securing the braking devices to the chassis frame of the rail vehicle; and
    wherein the first and second connection sections are welded to the cross-member and continuous brake carrier for the chassis frame of the rail vehicle, respectively.

8. The device as claimed in claim 7, wherein the first connection section is C-shaped and fits against the cross-member, such that the first connection section completely encompasses the side wall of the cross-member.

9. The device as claimed in claim 7, wherein the second connection section encloses an acute angle with a plane which extends over a longitudinal direction and the longitudinal axis; and
    wherein an intersection point formed between the extension of the second connection section and the plane is arranged on a side of the side wall oriented away from the longitudinal axis.

10. The device as claimed in claim 2, wherein each attachment means is connected to a side wall of the cross-member.

11. The device as claimed in claim 1, wherein the continuous brake carrier comprises two side elements and a web which interconnects the two side elements; and wherein the continuous brake carrier for the chassis frame of the rail vehicle has an essentially H-shaped cross section viewed in a longitudinal direction.

12. The device as claimed in claim 11, wherein the attachment means comprise bracket-type sections of the two side elements for connection to second connection sections, said bracket-type sections each being arranged in two projecting sections of the continuous brake carrier for the chassis frame of the rail vehicle on that side of the two side elements which faces towards the cross-member.

13. The device as claimed in claim 1, wherein the continuous brake carrier for securing the braking devices to the chassis frame of the rail vehicle comprises two projecting sections and a central section which interconnects the two projecting sections; and wherein the two projecting sections each extend outwards from the side wall of the cross member, parallel to the lengthwise direction, and the central section bridges the cross member in a lengthwise direction.

14. The device as claimed in claim 13, wherein the attachment means comprise bracket-type sections of the two side elements for connection to second connection sections, said bracket-type sections each being arranged in two projecting sections of the continuous brake carrier for the chassis frame of the rail vehicle on that side of the two side elements which faces towards the cross-member.

15. A chassis frame with a device for securing braking devices as claimed in claim 1, comprising two lengthwise members and a cross-member which connects the two lengthwise members, wherein two continuous brake carriers for securing the braking devices to the chassis frame of the rail vehicle with open cross sections are connected to the cross-member via the attachment means, and wherein each continuous brake carrier for the chassis frame of the rail vehicle includes the at least one securing point for the continuous braking devices for securing the braking devices to the chassis frame of the rail vehicle at each end in a lengthwise direction.

16. The chassis frame as claimed in claim 15, wherein the attachment means of the continuous brake carrier for the chassis frame of the rail vehicle comprise four bracket-type sections and four brackets, wherein a first connection section of a bracket is connected to each side wall of the cross member and a second connection section is connected to a bracket-type section of a side element of the continuous brake carrier for the chassis frame of the rail vehicle.

17. The chassis frame as claimed in claim 16, further comprising:

at least one supplementary member, oriented parallel to the longitudinal axis of the cross member, said supplementary member interconnecting projecting sections of the two continuous brake carriers for securing the braking devices to the chassis frame of the rail vehicle, respectively;

wherein the supplementary member includes a further securing point for a braking device.

18. The chassis frame as claimed in claim 15, further comprising:

at least one supplementary member, oriented parallel to the longitudinal axis of the cross member, said supplementary member interconnecting projecting sections of the two continuous brake carriers for securing the braking devices to the chassis frame of the rail vehicle, respectively;

wherein the supplementary member includes a further securing point for a braking device.

19. A device for securing braking devices to a chassis frame of a rail vehicle comprising a cross-member of the chassis frame, said cross-member having a longitudinal axis, and at least two securing points for braking devices, the securing points being spaced apart from the cross-member in a lengthwise direction which lies normal to the longitudinal axis, the device comprising:

a continuous brake carrier arranged above the cross-member, extending parallel to lengthwise members of the chassis frame in a lengthwise direction and having at least one securing point of the at least two securing points arranged at each end of the continuous brake carrier, said continuous brake carrier having an open cross section; and attachment means comprising at least one bracket which is oriented normal to the longitudinal axis and which includes a first connection section connected to the cross-member and a second connection section connected to the brake carrier, via which the brake carrier is connected to the cross-member and is spaced apart from the cross-member in a vertical direction;

wherein a flow of force in the continuous brake carrier is uninterrupted between the at least two securing points over an entire length of the continuous brake carrier in the lengthwise direction.

* * * * *